(No Model.)
A. A. WOLCOTT.
PIVOT CUTTING IMPLEMENT.
No. 349,470. Patented Sept. 21, 1886.
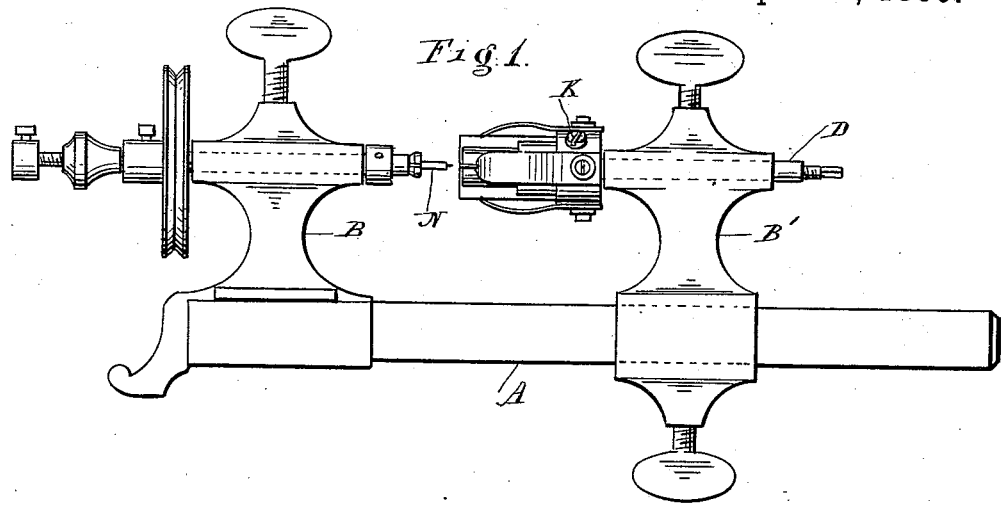
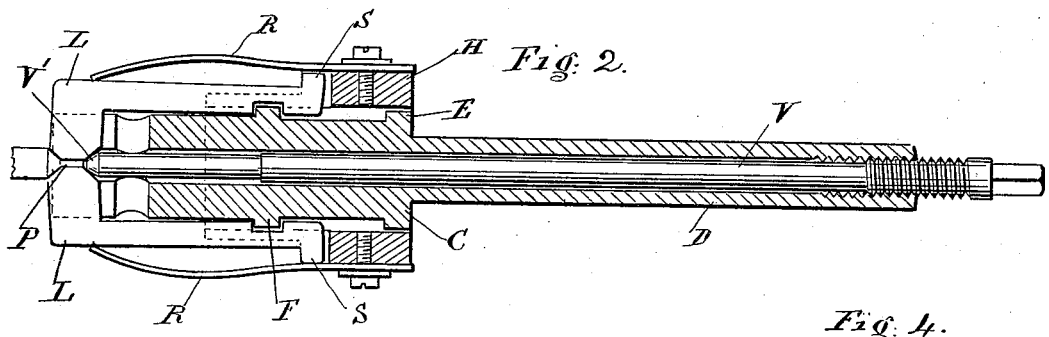
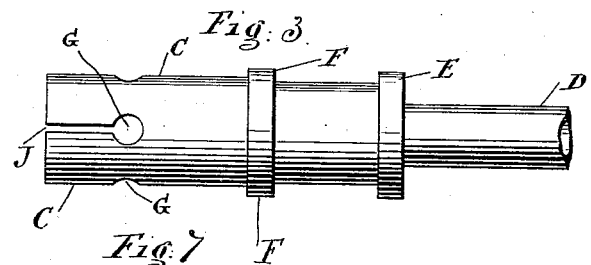
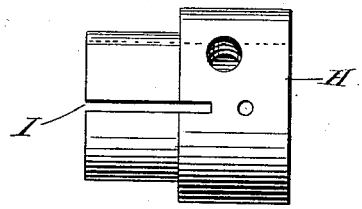
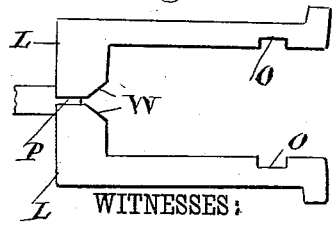
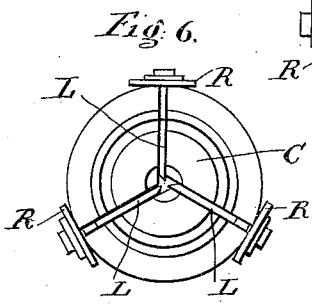
WITNESSES:
Donn Twitchell
C. Sedgwick
INVENTOR:
A. A. Wolcott
BY Munn & Co.
ATTORNEYS.

United States Patent Office.

AMOS A. WOLCOTT, OF TOM'S RIVER, NEW JERSEY.

PIVOT-CUTTING IMPLEMENT.

SPECIFICATION forming part of Letters Patent No. 349,470, dated September 21, 1886.

Application filed February 3, 1886. Serial No. 190,744. (No model.)

*To all whom it may concern:*

Be it known that I, AMOS A. WOLCOTT, of Tom's River, Ocean county, and State of New Jersey, have invented a new and useful Improvement on Implements for Cutting Pivots or Bearings, of which the following is a full, clear, and exact description.

This invention consists in an adjustable implement for cutting pivots or bearings adapted to be used in ordinary lathes or by hand, as will be hereinafter described.

Reference is to be had to the accompanying drawings, forming a part of this specification, in which similar letters of reference indicate corresponding parts in all the figures.

Figure 1 represents a side elevation of an ordinary jewelers' lathe, showing this cutting implement mounted in the foot-stock thereof, and the wire in the head-stock showing a pivot thereon cut by the implement. Fig. 2 represents a longitudinal central section through the implement, showing the cutters in elevation therein and the manner of adjusting them to cut pivots of different sizes. Fig. 3 is a side elevation of the spindle upon which the cutters are mounted, detached. Fig. 4 represents a side elevation of a slotted collar fitted and secured to the spindle detached, to which collar-springs are secured to maintain the cutters in position upon the spindle, as will be described. Fig. 5 represents an end elevation of this implement, showing four cutters placed at right angles therein with springs in section resting thereon. Fig. 6 is a similar view to Fig. 5, showing three cutters at equal distances apart. Fig. 7 represents a side elevation of two cutters detached.

A in the accompanying drawings represents the shear in an ordinary jewelers' lathe, and B B' the head and foot stocks respectively mounted thereon. To the foot-stock B' is fitted this implement for cutting pivots, which consists of a spindle, C, to slide back and forth therein on a shank, D, and to which spindle the adjustable cutters L to form the pivot are secured. This spindle C is provided with an annular rib, E, at its rear end and a central rib, F, as shown in Figs. 2 and 3.

To admit the cutters L the front end of the spindle C is slotted, as at J, and these slots terminate in openings G, to permit the cuttings from the pivot to escape.

On the heel of the spindle C is placed a collar, H, which extends over and beyond the annular rib F, and is provided with longitudinal slots I, to correspond with the slots J in the front end of the spindle, as shown in Figs. 3 and 4. The collar H is secured to the spindle C by a set-screw, K. (See Fig. 1.)

In the slots J and I of the spindle C and collar H are fitted the cutters L, which are shaped so as to converge to a common center at the front end of the spindle and meet thereat, as shown in Figs. 2, 5, and 6.

Fig. 5 represents an end view of a spindle with four cutters arranged to converge toward each other, and Fig. 6 shows an end view of a spindle with three cutters at equal distances apart therein. These cutters L are retained in position longitudinally in the spindle C by notches O fitting over the annular rib F, which construction serves also to admit of the adjustment of the cutting-edges P to vary the diameters of the pivots as may be required. The edges P of these cutters L may be varied to form the pivots either with or without shoulders, and of any desired shape. To retain these cutters L within their respective slots in the spindle C, and to hold them with sufficient force to form the pivots, springs R are secured to the collar H, their free ends bearing upon the backs of the cutters near their cutting ends, as represented in Fig. 1. The shanks of these cutters L are provided with heels S, which bear against the lower surfaces of the springs R, which, together with the springs, render the cutters adjustable to vary the diameters of the pivots to be cut. In order to set these cutters at the required distance apart to form different-sized pivots, a rod, V, is fitted to move back and forth centrally in the spindle C, its front end, V', being conical to act against the beveled inner edges, W, of the cutters, as represented in Figs. 2 and 7. The rear end of this rod V is provided with a screw-thread taking into a corresponding female screw-thread formed on the inner surface of the shank D, and projecting beyond the end of the shank sufficient to receive a wrench by which to turn the rod to move forward and back to adjust the cutters, as described. To illustrate the practical use of my invention in cutting pivots, it may be described briefly as follows: The wire N, on the end of which the pivot is to be formed, is firmly secured in the hollow mandrel of the head-stock B of a lathe, to be revolved therewith in the usual manner. The shank D of the spindle is inserted into the foot-stock B' of the lathe so that the cutters may center with the end of the wire, as shown in Fig. 1. Motion being given to the hollow mandrel in which the wire is secured, the spindle is moved forward, and by forcing the cutters against the end of the wire the pivot is cut and properly shaped at one operation.

Having thus fully described my invention, I claim as new, and desire to secure by Letters Patent—

1. The combination, with a slotted spindle, of cutters L, detachably held to said spindle, springs R and adjusting-rod V, arranged for operation substantially as shown and described.

2. The combination, with the slotted spindle C and slotted collar H, of adjustable and removable cutters L, springs R, and adjusting-rod V, constructed and arranged for operation substantially as shown and described.

AMOS A. WOLCOTT.

Witnesses:
ALBERT C. MARTIN,
CALVIN C. HAVENS.